US007895750B2

(12) United States Patent
Park et al.

(10) Patent No.: US 7,895,750 B2
(45) Date of Patent: Mar. 1, 2011

(54) METHOD OF MANUFACTURING INKJET PRINT HEAD

(75) Inventors: Byung Ha Park, Suwon-si (KR); Sung Joon Park, Suwon-si (KR); Young Ung Ha, Suwon-si (KR); Kyong Il Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 11/875,106

(22) Filed: Oct. 19, 2007

(65) Prior Publication Data

US 2008/0148567 A1 Jun. 26, 2008

(30) Foreign Application Priority Data

Dec. 26, 2006 (KR) ...................... 10-2006-0134030

(51) Int. Cl.
*B23P 17/00* (2006.01)
*G01D 15/00* (2006.01)
*B41J 2/045* (2006.01)

(52) U.S. Cl. .......................... 29/890.1; 29/829; 29/830; 29/831; 29/832; 29/841; 216/27; 347/68

(58) Field of Classification Search ................ 29/890.1, 29/830, 831, 832, 852, 835, 837, 846; 216/27, 216/55, 57, 62, 72, 73, 79; 347/65, 68–70, 347/44, 47, 57, 62
See application file for complete search history.

(56) References Cited

U.S. PATENT DOCUMENTS 6,454,395 B1 * 9/2002 Irinoda ........................ 347/54

(Continued)

FOREIGN PATENT DOCUMENTS

EP 1 284 188 A2 2/2003

(Continued)

OTHER PUBLICATIONS

European Communication dated Feb. 13, 2008 in Application No. 07119740.4-1251.

(Continued)

*Primary Examiner*—Derris H Banks
*Assistant Examiner*—Tai Nguyen
(74) *Attorney, Agent, or Firm*—Stanzione & Kim, LLP

(57) ABSTRACT

A method of manufacturing an inkjet print head that includes an improved process of forming an ink feed hole, thereby enabling an increase in productivity and a favorable ink supply via the ink feed hole. The method includes preparing a substrate on which a heater to heat an ink is formed on the front side thereof, forming a flow passage formation layer on the front side of the substrate such that the flow passage formation layer defines an ink flow passage, forming a nozzle layer provided with a nozzle on the flow passage formation layer, forming a first protective layer such that the first protective layer covers the flow passage formation layer and the nozzle layer, applying a mask material used to etch the substrate to the rear side of the substrate, applying a second protective layer to the lateral side of the substrate to protect the lateral side of the substrate, and forming an ink feed hole on the substrate by wet etching. Tantalum (Ta) is used as the mask material. Parylene is used as the second protective layer.

12 Claims, 19 Drawing Sheets

U.S. PATENT DOCUMENTS

| | | | | |
|---|---|---|---|---|
| 6,532,027 | B2 * | 3/2003 | Ozaki et al. | 347/64 |
| 6,622,373 | B1 * | 9/2003 | Tu | 29/611 |
| 6,733,611 | B2 * | 5/2004 | Hayashi et al. | 156/230 |
| 2005/0067376 | A1 * | 3/2005 | Park et al. | 216/27 |
| 2005/0155949 | A1 | 7/2005 | Park et al. | |
| 2006/0266733 | A1 | 11/2006 | Kato | |

FOREIGN PATENT DOCUMENTS

| | | |
|---|---|---|
| EP | 1 433 609 A1 | 6/2004 |
| EP | 1 627 744 A1 | 2/2006 |
| JP | 03-009847 | 1/1991 |
| JP | 9-123468 | 5/1997 |
| JP | 2003-266394 | 9/2003 |
| JP | 2005-104156 | 4/2005 |
| JP | 2005-144920 | 6/2005 |
| JP | 2005-349753 | 12/2005 |
| JP | 2006-082331 | 3/2006 |

OTHER PUBLICATIONS

Japanese Office Action issued Mar. 17, 2010 in JP Application No. 2007-300914.

* cited by examiner

METHOD OF MANUFACTURING INKJET PRINT HEAD

CROSS-REFERENCE TO RELATED APPLICATIONS

This application claims the benefit of Korean Patent Application No. 2006-0134030, filed on Dec. 26, 2006 in the Korean Intellectual Property Office, the disclosure of which is incorporated herein by reference.

BACKGROUND OF THE INVENTION

1. Field of the Invention

The present general inventive concept relates to a method of manufacturing an inkjet print head. More specifically, the present general inventive concept relates to a method of manufacturing an inkjet print head that includes an improved process to form an ink feed hole.

2. Description of the Related Art

Inkjet print heads print an image by which fine droplets of a printing ink therein are discharged at the desired positions on a printing sheet. Such an inkjet print head is divided into a thermal print type and a piezoelectric print type, based on the discharge mechanism of ink droplets. The thermal inkjet print head generates bubbles in an ink via a heating source and discharges ink droplets by an expansion force of the generated bubbles.

General thermal print heads include an ink feed hole for supplying an ink, a substrate provided with a heater for heating the ink on the surface thereof, a flow passage formation layer, which is arranged on the substrate and forms a flow passage and an ink chamber, and a nozzle layer, which is arranged on the flow passage formation layer and is provided with a nozzle corresponding to the ink chamber.

To manufacture such an inkjet print head, a binding method and a monolithic method are commonly used. The binding method is carried out by separately producing a substrate and a nozzle layer, aligning the substrate and the nozzle layer, and attaching the substrate to the nozzle layer via a polymer thin film. Meanwhile, the monolithic method is carried out by directly forming a flow passage formation layer and a nozzle layer on a substrate. The monolithic method eliminates a necessity of an adhesive demanding the strict requirements as well as alignment operation of the nozzle layer and equipment required to perform the alignment, thus having advantages of reduced production costs and increased productivity, as compared to the binding method.

FIGS. 1A through 1F are views illustrating a conventional monolithic print head manufacturing method. As illustrated in FIG. 1A, flow passage formation layers 2 are formed on a substrate 1, on which heaters 1*a* for heating an ink and electrodes 1*b* for supplying an electric current to the heaters 1*a* are arranged, by photolithography. As illustrated in FIG. 1B, regions where there is no flow passage formation layer 2 on the substrate 1 are filled with a photoresist, thereby forming sacrificial layers 3. As illustrated in FIG. 1C, a nozzle layer 4 provided with a nozzle 4*a* is formed on the resulting structure including the flow passage formation layers 2 and the sacrificial layers 3. The nozzle layer 4 is formed by photolithography, which is the same method as in formation of the flow passage formation layers. As illustrated in FIG. 1D, an etching mask 5 used to form an ink feed hole is formed. As illustrated in FIG. 1E, the substrate 1 is etched to form an ink feed hole, such that the ink feed hole passes through the rear side of the substrate 1 exposed through the etching mask 5. The etching of the substrate 1 is carried out by dry etching using plasma. The etching mask 5 is removed and the sacrificial layers 3 are removed by using a solvent, thereby obtaining an inkjet print head as illustrated in FIG. 1F.

In the conventional method, the formation of the ink feed hole 1*c* is carried out by placing a wafer in dry etching equipment and performing a process on each wafer. Accordingly, the method has a disadvantage of deterioration in productivity. In an attempt to improve productivity, an increase in number of the dry etching equipment has been used, but this increase in equipment has a limitation due to high-priced equipment.

In addition, the ink feed hole 1*c* formed by dry etching has a narrow width, thus making it difficult to obtain the desired ink supply performance.

SUMMARY OF THE INVENTION

The present general inventive concept provides a method of manufacturing an inkjet print head that includes an improved process to form an ink feed hole, thereby enabling an increase in productivity and a favorable ink supply via the ink feed hole.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a method of manufacturing an inkjet print head including preparing a substrate on which a heater to heat an ink is formed on the front side thereof, forming a flow passage formation layer on the front side of the substrate such that the flow passage formation layer defines an ink flow passage, forming a nozzle layer provided with a nozzle on the flow passage formation layer, forming a first protective layer such that the first protective layer covers the flow passage formation layer and the nozzle layer, applying a mask material used to etch the substrate to the rear side of the substrate, applying a second protective layer to protect the lateral side of the substrate, and forming an ink feed hole on the substrate by wet etching.

The mask material may be made of tantalum (Ta), and the second protective layer may be made of parylene.

The second protective layer may be applied to the lateral side of the substrate by chemical vapor deposition (CVD).

The first protective layer may be made of a phenoxy resin.

Forming an ink feed hole on the substrate by wet etching may include patterning the mask material to form an etching mask used for formation of the ink feed hole; and wet etching the rear side of the substrate exposed through the etching mask.

The second protective layer may be applied to the rear side of the substrate and the mask material such that the second protective layer covers the rear side of the substrate and the mask material. Forming an ink feed hole on the substrate by wet etching may include patterning the mask material and the second protective layer to form an etching mask used for formation of the ink feed hole and wet etching the rear side of the substrate exposed through the etching mask.

Forming a nozzle layer may include forming a trench on the front side of the substrate, forming a sacrificial layer on the substrate, on which the trench and the flow passage formation layer are arranged, such that the sacrificial layer covers the flow passage formation layer, planarizing the upper surfaces of the sacrificial layer and the flow passage formation layer by chemical mechanical polishing (CMP), and forming a nozzle layer on the sacrificial layer and the flow passage formation layer. The method of manufacturing an inkjet print head may further include removing the sacrificial layer after forming an ink feed hole on the substrate by wet etching.

The foregoing and/or other aspects and utilities of the present general inventive concept can also be achieved by providing a method of manufacturing an inkjet print head including preparing a substrate on which a heater to heat an ink and an electrode to supply an electric current are formed on the front side thereof, forming a flow passage formation layer on the front side of the substrate by photolithography such that the flow passage formation layer defines an ink flow passage, forming a sacrificial layer such that the sacrificial layer covers the front side of the substrate and the flow passage formation layer, and planarizing the upper surface of the sacrificial layer by chemical mechanical polishing (CMP), forming a nozzle layer on the sacrificial layer and the flow passage formation layer by photolithography, forming a first protective layer such that the first protective layer covers the flow passage formation layer and the nozzle layer, applying a mask material used for etching of the substrate to the rear side of the substrate, applying a second protective layer to at least one side of the substrate and the mask material such that the second protective layer covers the at least one side of the substrate and the mask material, and wet etching the rear side of the substrate to form an ink feed hole.

The foregoing and/or other aspects and utilities of the present general inventive concept can also be achieved by providing a method of manufacturing an inkjet print head including forming a flow passage formation layer and a nozzle layer on a front side of a substrate, forming a first protective layer to cover the flow passage formation layer and the nozzle layer, applying a mask material used to etch the substrate at a rear side of the substrate, forming a second protective layer to protect lateral sides of the substrate, and forming an ink feed hole on the substrate by wet etching.

The forming an ink feed hold may include patterning the mask material and the second protective layer before etching.

The foregoing and/or other aspects and utilities of the present general inventive concept can also be achieved by providing a method of manufacturing an inkjet print head including forming a flow passage formation layer and a nozzle layer on a surface of a substrate by photolithography, forming a first protective layer to cover the flow passage formation layer and the nozzle layer, applying a mask material used to etch the substrate at a rear side of the substrate, applying a second protective layer to at least one side of the substrate and the mask material such that the second protective layer covers the at least one side of the substrate and the mask material, and wet etching the rear side of the substrate to form an ink feed hole.

The foregoing and/or other aspects and utilities of the present general inventive concept can also be achieved by providing a method of manufacturing an inkjet print head including forming a flow passage formation layer and a nozzle layer on a front side of a substrate, forming a first protective layer to cover the flow passage formation layer and the nozzle layer, forming a mask layer at a rear side of the substrate, and forming an ink feed hole on the substrate by wet etching the mask layer.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
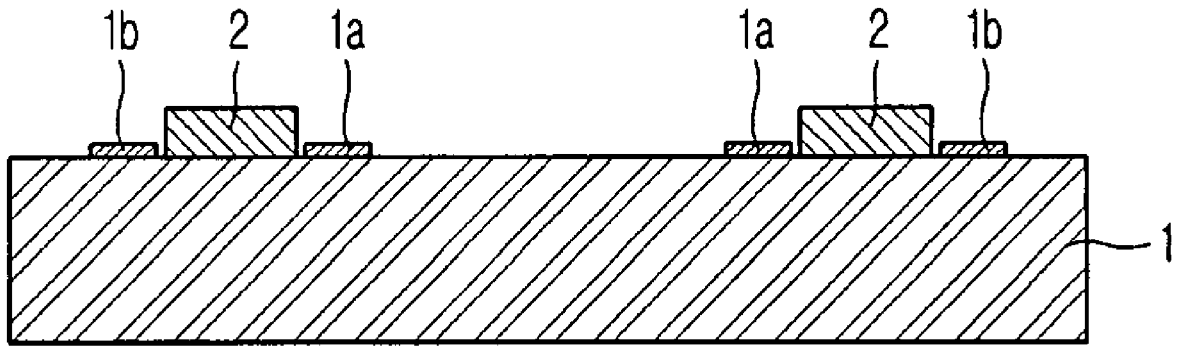
FIG. 1A (RELATED ART)
FIGS. 1A-1F are views illustrating a conventional monolithic print head manufacturing method.
Figure 1B:
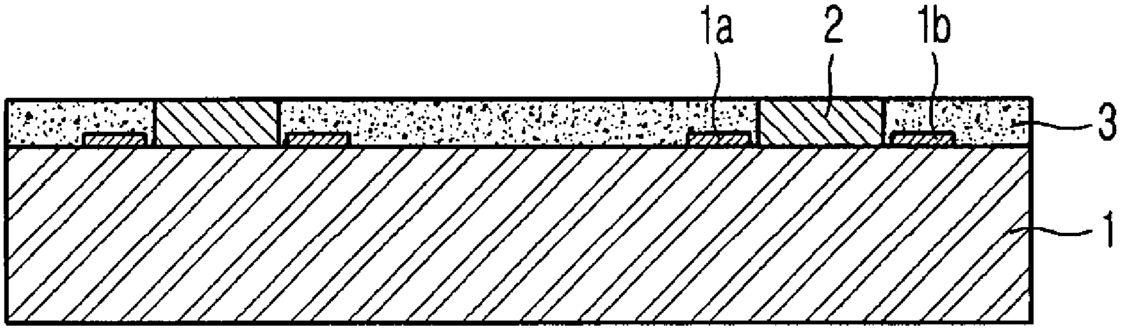
FIG. 1B (RELATED ART)
Figure 1C:
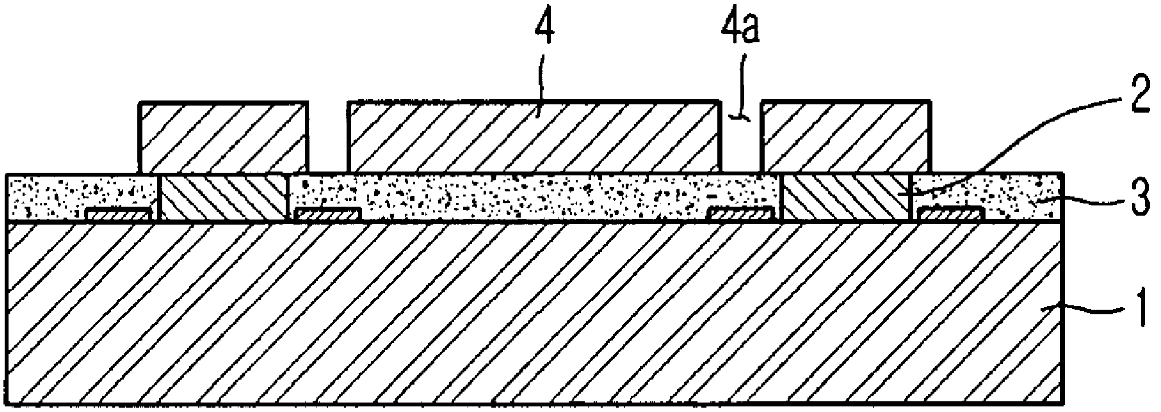
FIG. 1C (RELATED ART)
Figure 1D:
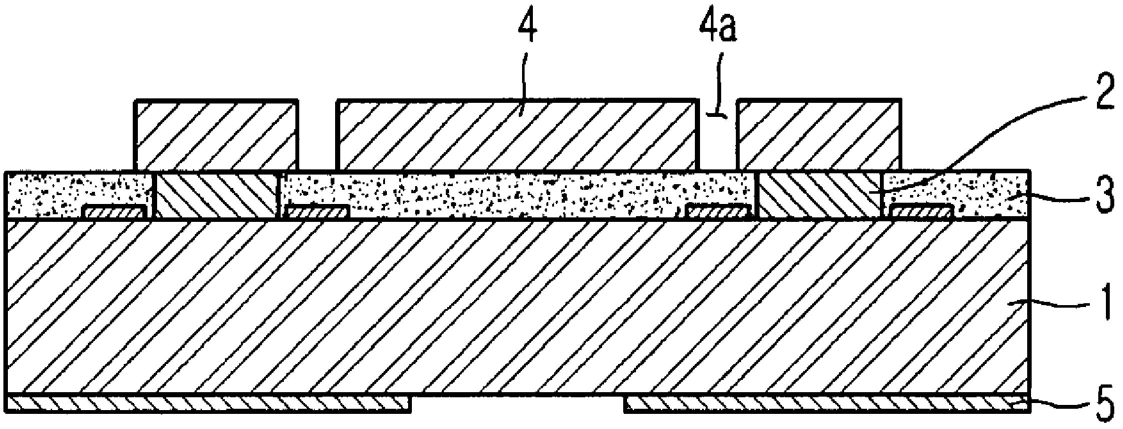
FIG. 1D (RELATED ART)
Figure 1E:
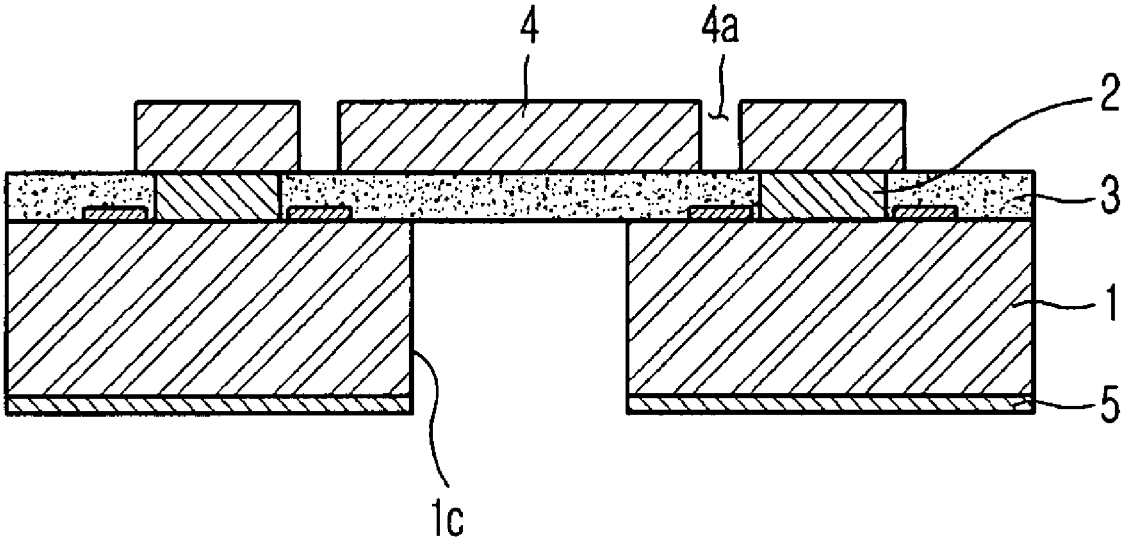
FIG. 1E (RELATED ART)
Figure 1F:
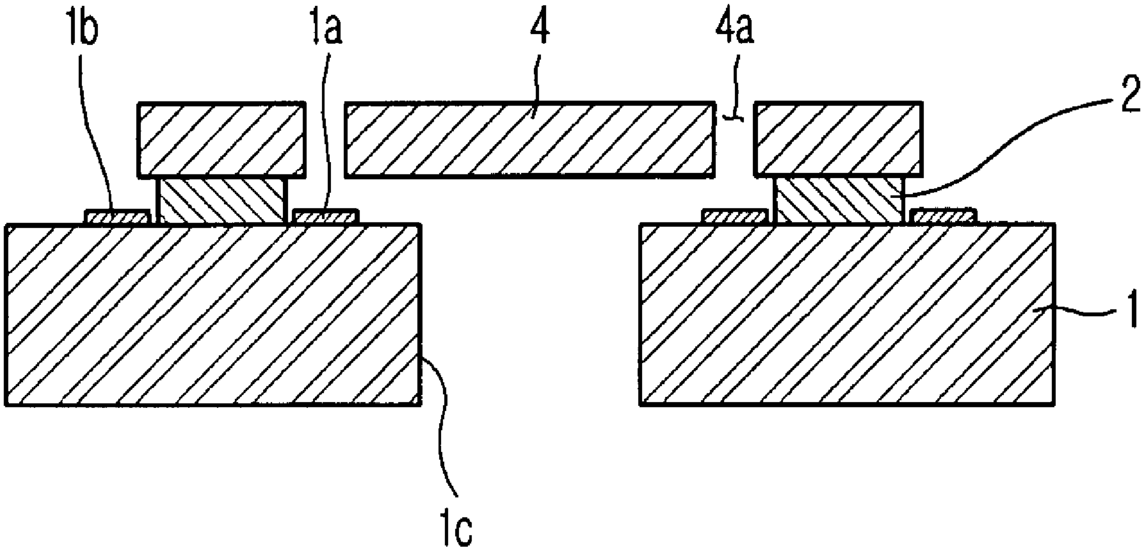
FIG. 1F (RELATED ART)

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 2:
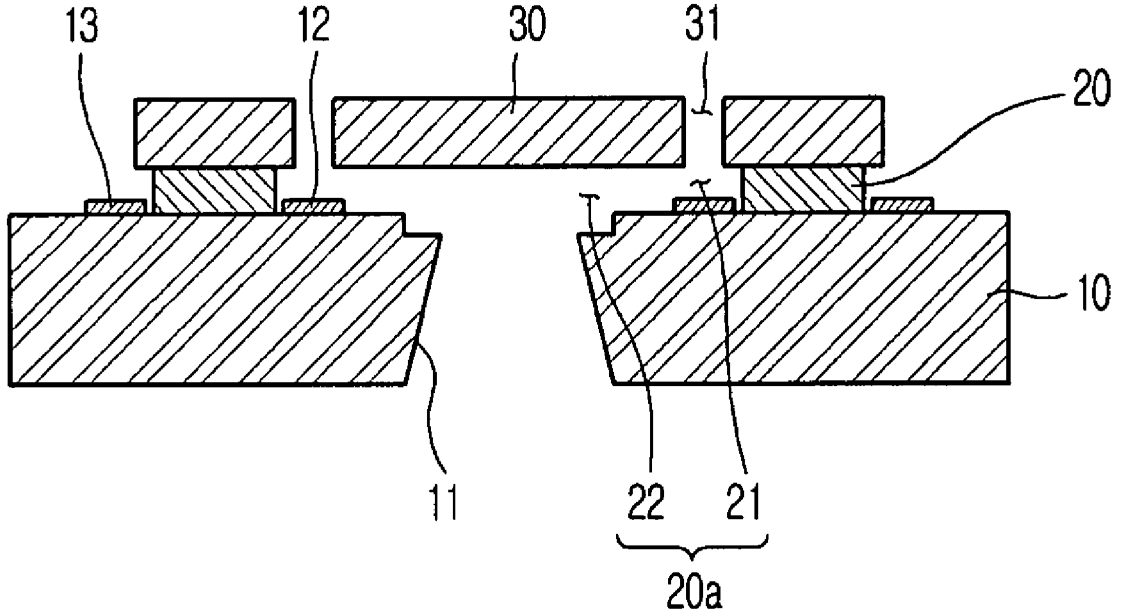
FIG. 2 is a sectional view illustrating the structure of an inkjet print head manufactured by a method according to the present general inventive concept.

First, a description will be given of an exemplary embodiment of the present general inventive concept with reference to the annexed drawings. FIG. 2 is a sectional view illustrating the structure of an inkjet print head manufactured by a method according to the present general inventive concept.

As illustrated in FIG. 2, the inkjet print head manufactured according to an embodiment of the present general inventive concept includes a substrate 10, flow passage formation layers 20 deposited on the substrate 10, and nozzle layers 30 formed on the flow passage formation layers 20. An ink feed hole 11 to feed an ink is formed in the substrate 10. Each flow passage formation layer 20 defines an ink flow passage 20*a* connecting the ink feed hole 11 to the nozzle 31. The ink flow passage 20*a* includes an ink chamber to be filled with an ink, and a restrictor 22 connecting the ink feed hole 11 to the ink chamber 21. The nozzle layer 30 is provided with a nozzle 31 to discharge the ink supplied from the ink chamber. A heater 12 arranged under the ink chamber 21 and to heat the ink which exists in the ink chamber 21, and an electrode 13 to feed an electric current to the heater 12 are formed on the front side of the substrate 10.

FIGS. 3A-3J are views illustrating a method of manufacturing the inkjet print head according to the embodiment of FIG. 2.

Figure 3A:
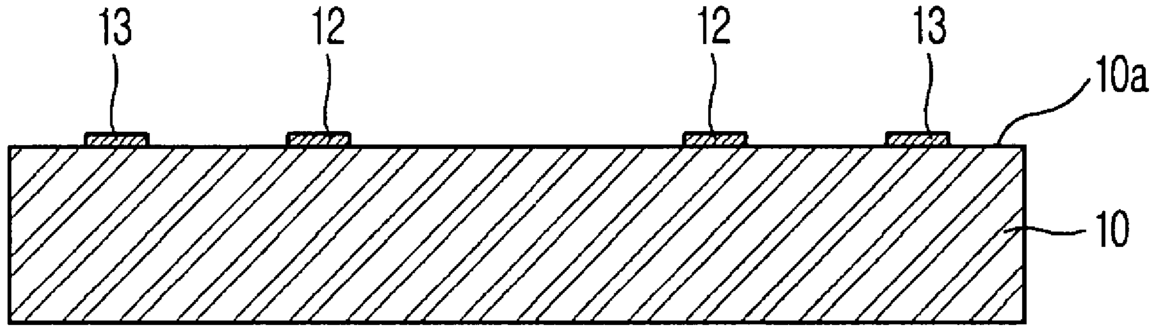
FIGS. 3A-3J are views illustrating a method of manufacturing an inkjet print head according to an embodiment of the present general inventive concept.

As illustrated in FIG. 3A, a substrate 10, on which heaters 12 and electrodes 13 are arranged on the front side thereof, is prepared. A silicon wafer can be used as the substrate 10. Each heater 12 can be formed by depositing a heat resistant material, e.g., tantalum nitride and a tantalum-aluminium alloy on the substrate 10 by sputtering or chemical vapor deposition (CVD), and patterning the resulting structure. A protective material made of a silicon oxide film or a silicon nitride film may be arranged on the heaters 12 and the electrodes 13 (not illustrated).

Figure 3B:
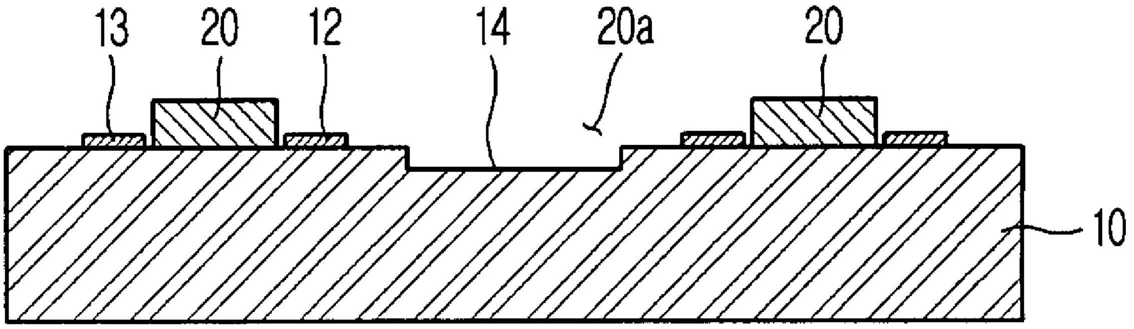

As illustrated in FIG. 3B, a trench 14 is formed on the front side of the substrate 10. The trench 14 serves to uniformly form the ink feed hole 11 on the front side of the substrate 10 (See. FIG. 2). The trench 14 can be formed by dry etching using a plasma. The flow passage formation layer 20 is formed on the substrate 10, on which the heaters 12 and electrodes 13 are formed, by photolithography. Although not illustrated in the drawings, the method of forming the flow passage formation layer 20 can include applying a negative photoresist to the substrate 10 by spin coating to form a photoresist layer, exposing the photoresist layer to a light through a photomask, in which the ink chamber and restrictor patterns are formed, and developing the photoresist layer to remove a non-exposed region thereof, thereby forming a flow passage formation layer 20 defining an ink flow passage 20*a*, as illustrated in FIG. 3B.

Figure 3C:
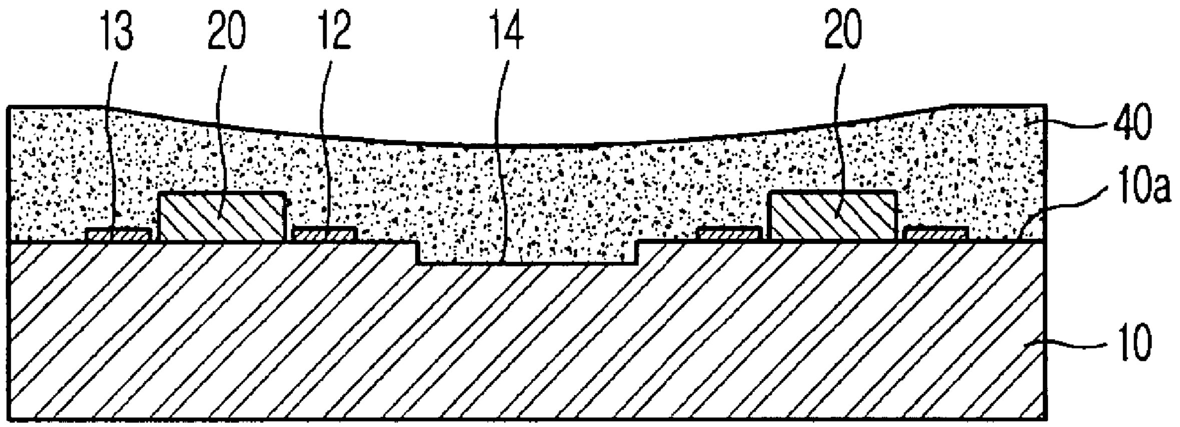

As illustrated in FIG. 3C, a sacrificial layer 40 is formed such that the sacrificial layer 40 covers the entire front side of the substrate 10 including the flow passage formation layer 20. The sacrificial layer 40 is formed by application of a positive photoresist by spin coating. The sacrificial layer 40 is exposed to an etchant, upon etching to form an ink feed hole. Accordingly, it is preferred that the sacrificial layer 40 be made of a material with a high resistance against the etchant.

Figure 3D:
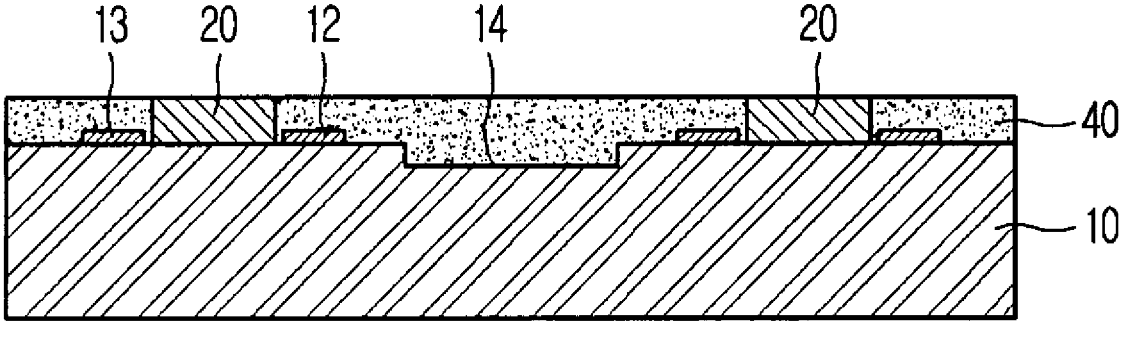

As illustrated in FIG. 3D, the upper surfaces of the sacrificial layer 40 and the flow passage formation layer 20 can be planarized by chemical mechanical polishing (CMP) such that they have the same height. The planarization enables the nozzle layer 30 to come into contact with the flow passage formation layer 20, thus improving durability of the inkjet print head. In addition, the planarization allows the shape and size of the ink flow passage 20*a* to be correctly adjusted, thereby leading to an improvement in ink discharge performance.

Figure 3E:
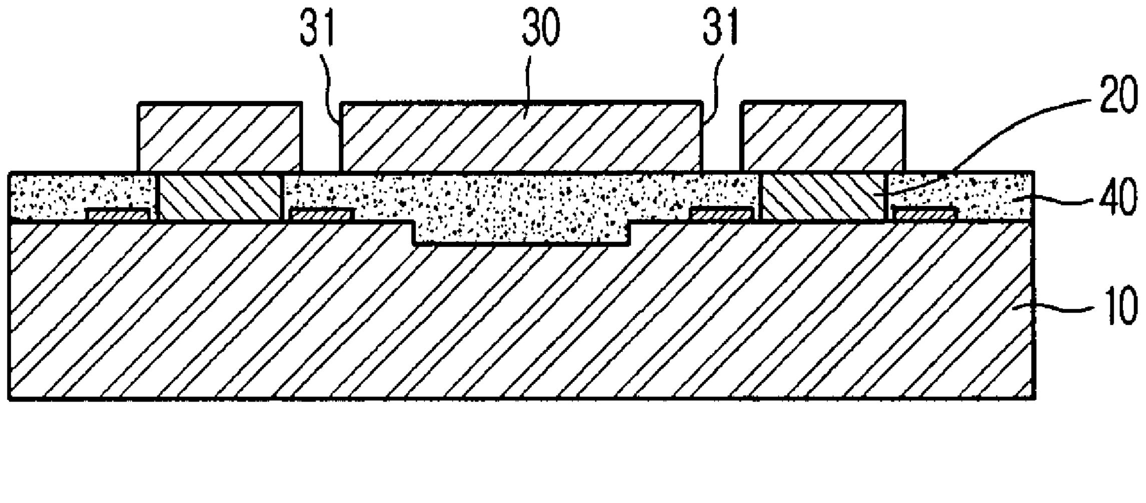

As illustrated in FIG. 3E, the nozzle layer 30 is formed on the planarized sacrificial layer 40 and flow passage formation layer 20. The nozzle layer 30 is formed by photolithography, which is the same method as in formation of the flow passage formation layer 20. That is to say, a photoresist is applied to the flow passage formation layer 20 to form a photoresist layer. Then, the photoresist layer is subjected to exposure to light through a nozzle-patterned photomask. The resulting structure is developed to remove a non-exposed region, thereby forming a nozzle layer 30 provided with a nozzle 31, as illustrated in FIG. 3E.

Figure 3F:
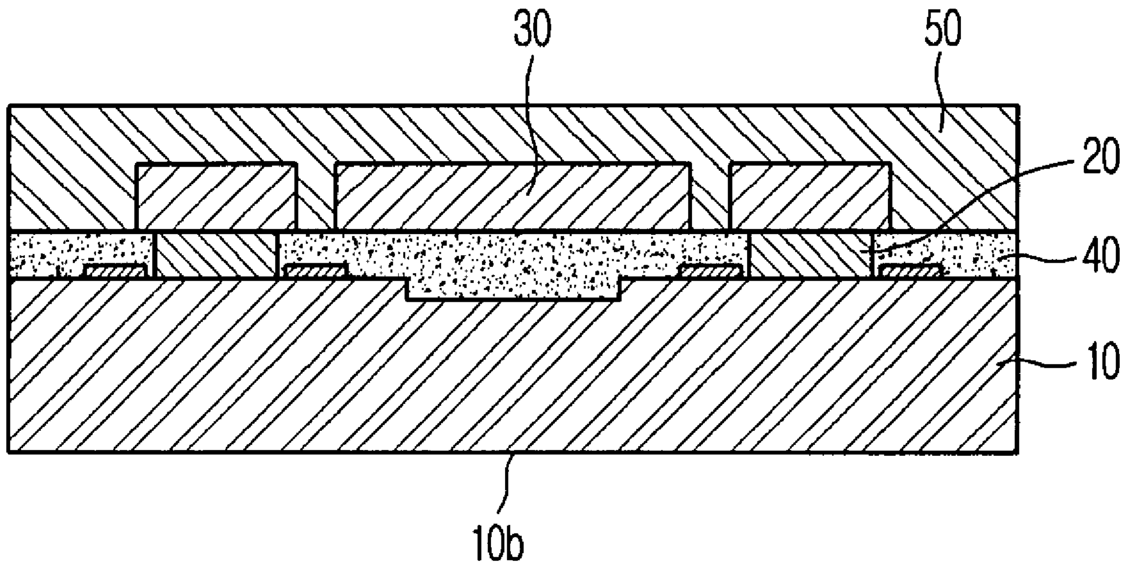

As illustrated in FIG. 3F, a first protective layer 50 is formed such that the first protective layer 50 covers the nozzle layer 30 and the sacrificial layer 40. The first protective layer 50 protects layers arranged on the front side of the substrate 10 during etching of the rear side 10*b* of the substrate 10 form an ink feed hole. The first protective layer 50 can be made of a resin, e.g., a phenoxy resin with high chemical resistance.

Figure 3G:
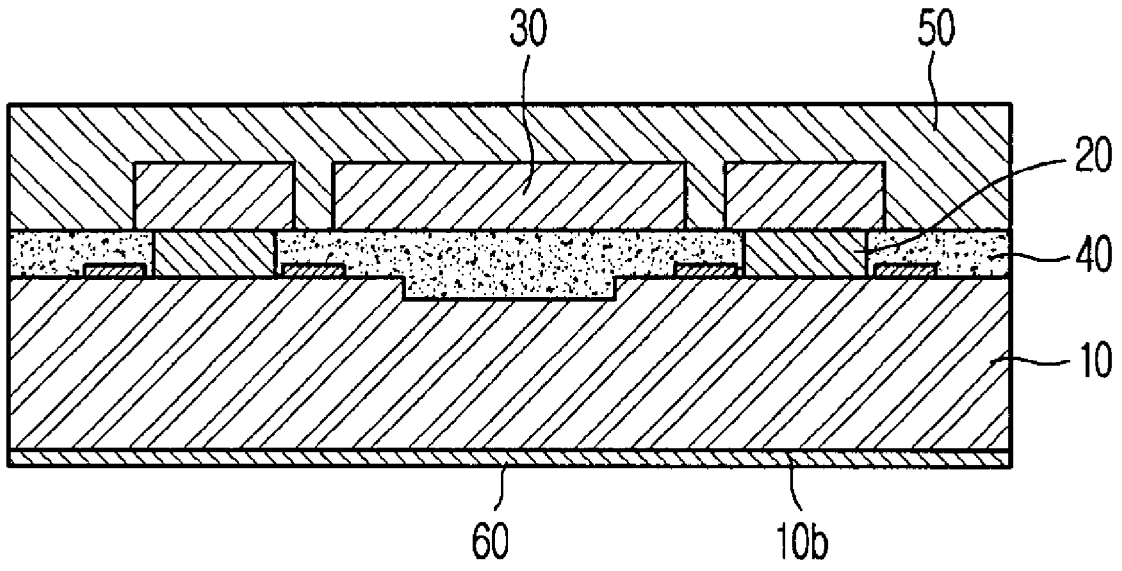

As illustrated in FIG. 3G a mask material 60 is applied to the rear side 10*b* of the substrate 10. Tantalum (Ta) is used as the mask material 60. In conventional cases, silicon dioxide (SiO2) was commonly used as a mask material. The use of tantalum according to an embodiment of the present general inventive concept causes reduction in undercut defined as a structure, in which the substrate is partially removed inwardly from the mask material during etching, thereby realizing relatively more accurate formation of the ink feed hole. The details of the formation of the ink feed hole will be described below in association with FIG. 3J.

Figure 3H:
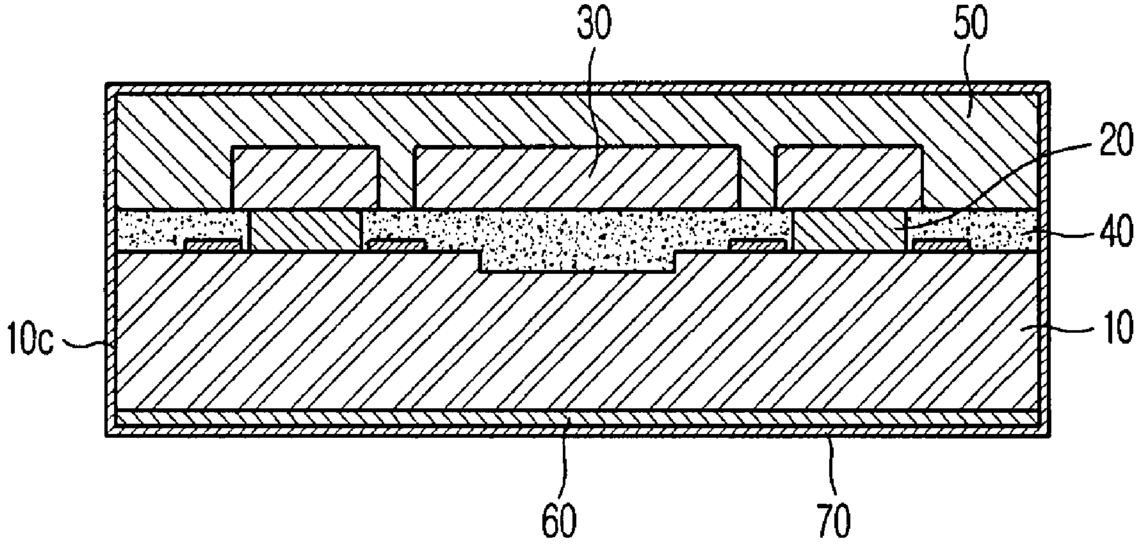

After application of the mask material 60, a second protective layer 70 is applied such that the second protective layer 70 covers the mask material 60, the lateral side 10*c* of the substrate 10 and the first protective layer 50, as illustrated in FIG. 3H. The application of the second protective layer 70 can be carried out by chemical vapor deposition (CVD). The second protective layer 70 protects the lateral side 10*c* of the substrate 10 during wet etching to form an ink feed hole. The second protective layer 70 may be made of parylene. Any material may be used without any particular limitation so long as it protects the substrate from an etchant used for wet etching to form an ink feed hole.

According to an embodiment of the present general inventive concept, the second protective layer 70 is formed such that it covers the overall resulting structure, as illustrated in FIG. 3H. Alternatively, only the lateral side 10*c* of the substrate 10 may be covered with the second protective layer 70.

Figure 3I:
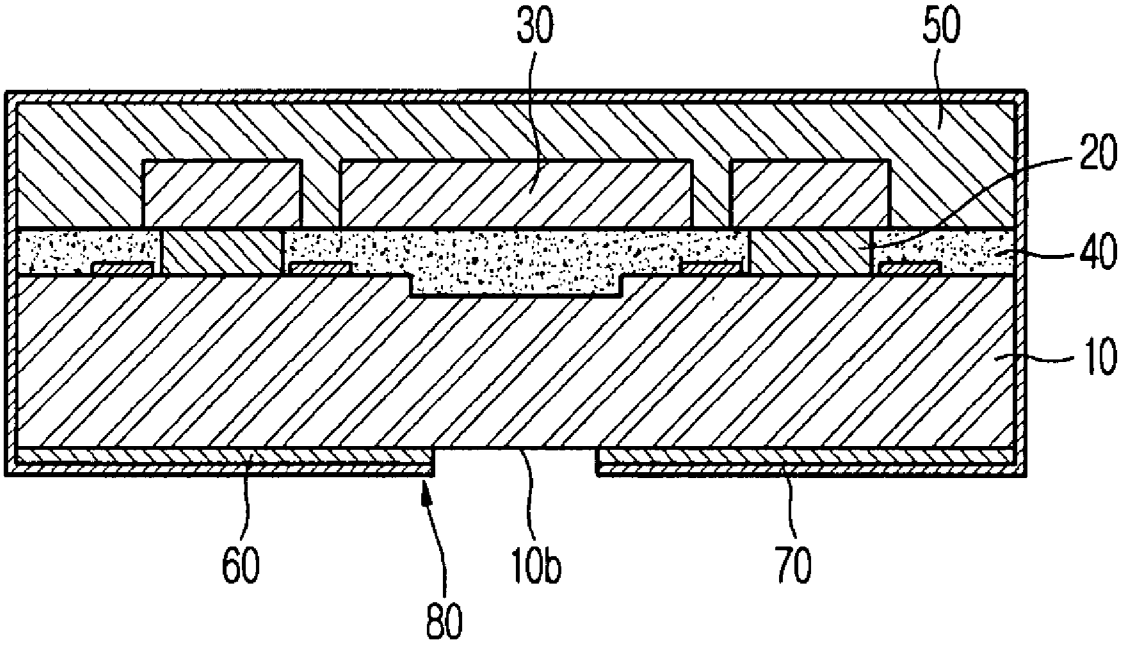

As illustrated in FIG. 3I, a double layer including the mask material 60 and the second protective layer 70 is subjected to patterning, thereby forming an etching mask 80 used to form an ink feed hole. (See. FIG. 2). In the case that the second protective layer 70 covers only the lateral side 10*c* of the substrate 10, only the mask material 60 is patterned to form an etching mask.

Figure 3J:
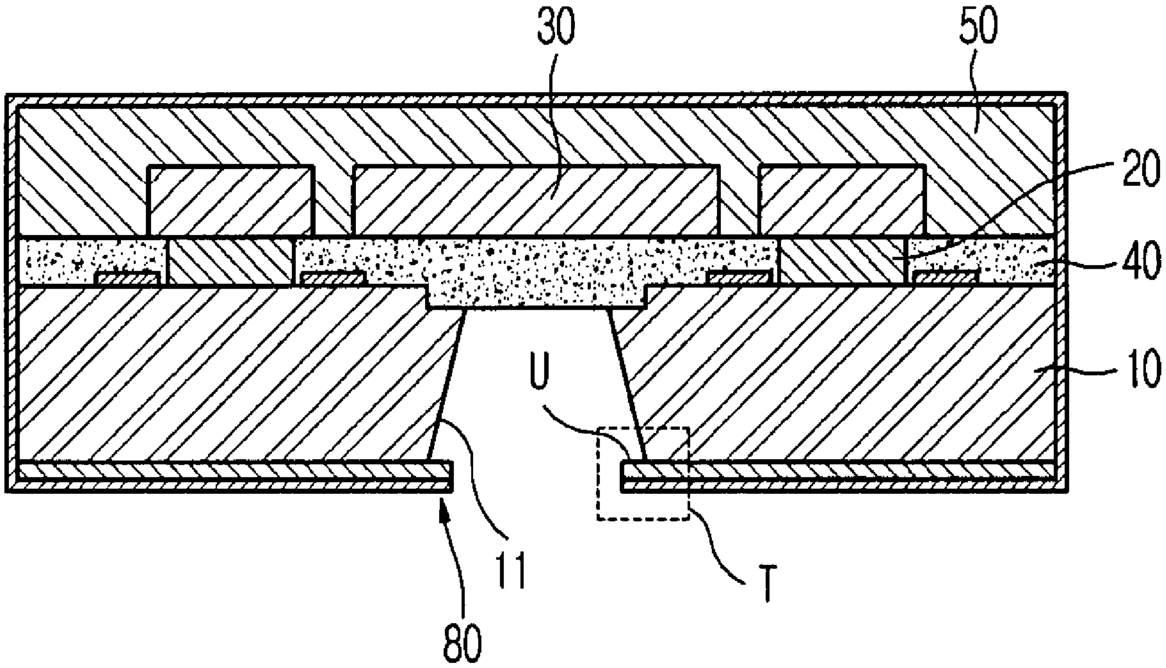

After formation of the etching mask 80, the resulting structure as illustrated in FIG. 3I is dipped in an etchant and is subjected to etching until the sacrificial layer 40 is exposed by removing the substrate 10 from the rear side 10*b* by being exposed through the etching mask 80. As a result of the etching, an ink feed hole 11 is formed, as illustrated in FIG. 3J. Tetramethylammonium hydroxide (TMAH) may be used as the etchant.

During formation of the ink feed hole 11 by dipping the substrate 10 in the etchant, the etchant penetrates into the etching mask 80. As a result, an undercut section U occurs, as illustrated in FIG. 3J. The excessive occurrence of the undercut causes a deterioration in dimensional prediction capability. Accordingly, it is preferred that an occurrence of the undercut be as little as possible.

Figure 4A:
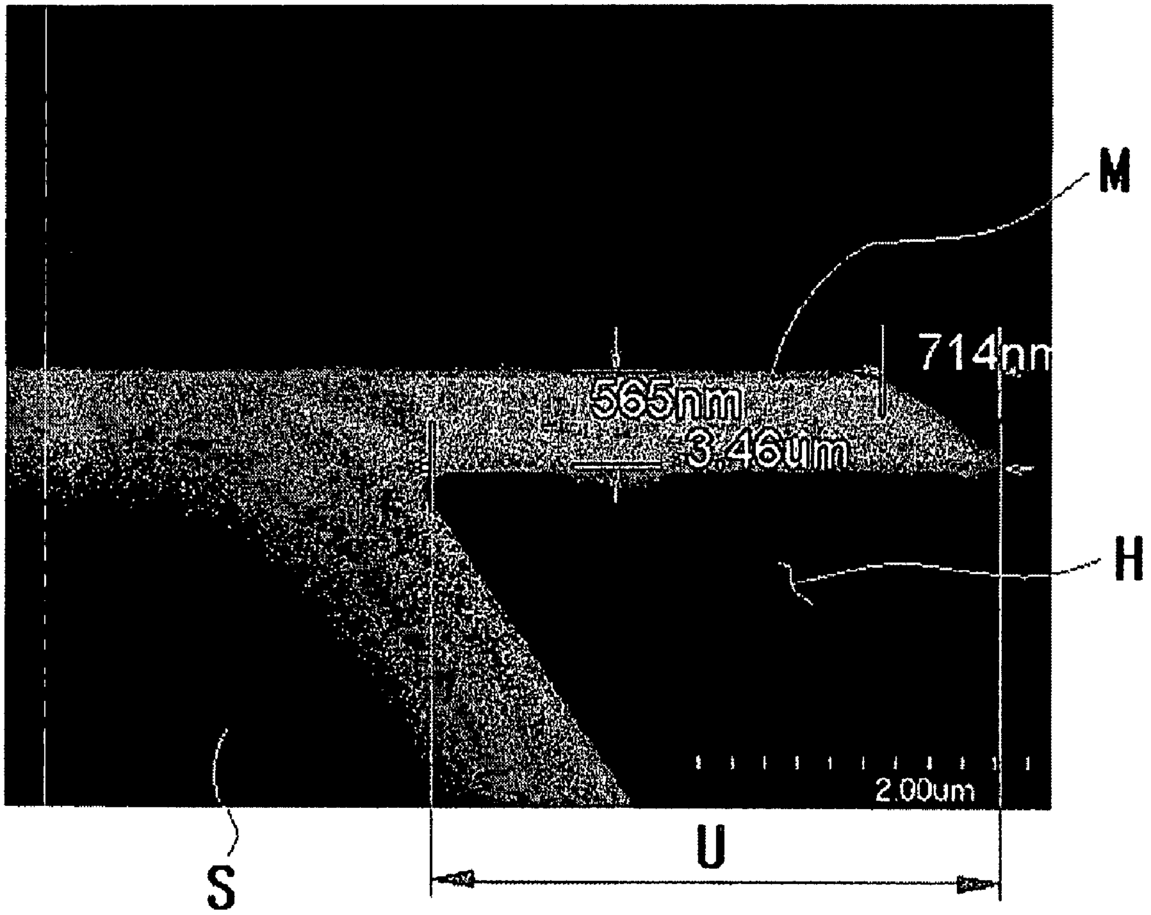
FIGS. 4A-4B are photographs illustrating an undercut structure of each ink feed hole formed according to a comparative embodiment and an embodiment of the present general inventive concept.
Figure 4B:
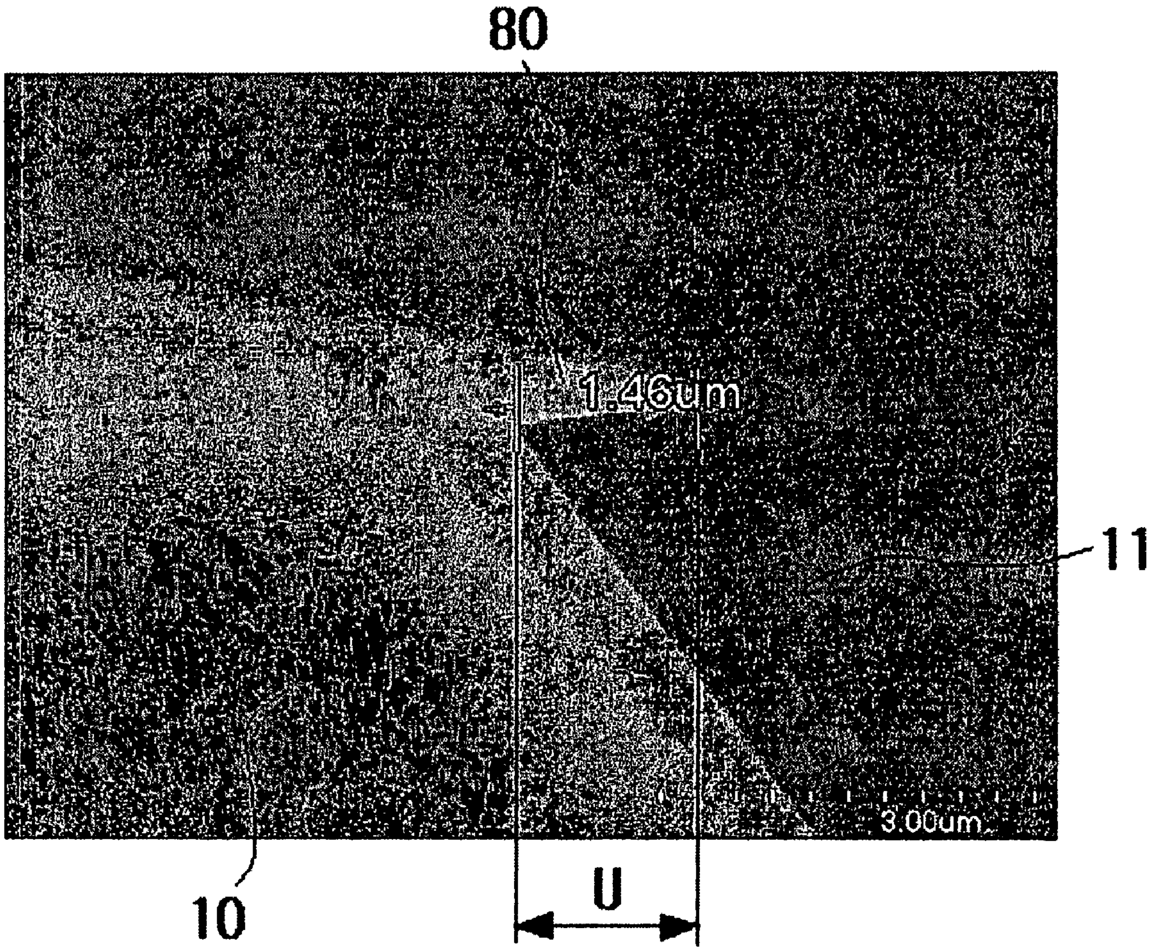

FIGS. 4A through 4B are photographs illustrating the undercut region T in FIG. 3J. In FIGS. 4A and 4B, the top and bottom of the substrate in FIG. 3 are reversed.

FIG. 4A is a photograph illustrating an ink feed hole formed by using silicon oxide as an etching mask according to a comparative embodiment of the present general inventive concept. In this case, the length of the undercut U is approximately 3.46 μm. In FIG. 4A, "S," "M" and "H" designates "substrate," "etching mask" and "ink feed hole," respectively.

FIG. 4B is a photograph illustrating an ink feed hole formed by using tantalum as an etching mask according to an embodiment of the present general inventive concept. In this case, the length of the undercut U is approximately 1.46 μm. As apparent from the foregoing, the use of tantalum causes a reduction in the undercut U, thereby making it possible to control the dimension of the ink feed hole more accurately. In FIG. 4B, "10," "80" and "11" designates "substrate," "etching mask" and "ink feed hole," respectively.

The etching mask 80, the first protective layer 50, the second protective layer 70 and sacrificial layer 40 are removed from the resulting structure illustrated in FIG. 3J, to obtain a final inkjet print head.

As apparent from the above description, according to a method of the present general inventive concept, an ink jet head is formed by wet etching suitable for mass-production. Accordingly, the method has advantages of increased productivity and relatively favorable ink feed via the ink feed hole.

In addition, the method uses an mask material capable of allowing an occurrence of an undercut to be lowered, during etching of the ink feed hole. In accordance with the present general inventive concept, a protective layer to protect the one side of a substrate is further applied to the substrate, thereby making it possible to control the dimension of the ink feed hole more accurately.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of manufacturing an inkjet print head comprising:

preparing a substrate on which a heater to heat an ink is formed on the front side thereof;

forming a flow passage formation layer on the front side of the substrate such that the flow passage formation layer defines an ink flow passage;

forming a nozzle layer provided with a nozzle on the flow passage formation layer;

forming a first protective layer such that the first protective layer covers the flow passage formation layer and the nozzle layer;

applying a mask material used to etch the substrate to the rear side of the substrate;

applying a second protective layer to protect a lateral side of the substrate; and forming an ink feed hole on the substrate by wet etching.

2. The method according to claim 1, wherein the mask material is made of tantalum (Ta).

3. The method according to claim 1, wherein the second protective layer is made of parylene.

4. The method according to claim 1, wherein the second protective layer is applied to the lateral side of the substrate by chemical vapor deposition (CVD).

5. The method according to claim 1, wherein the first protective layer is made of a phenoxy resin.

6. The method according to claim 1, wherein forming an ink feed hole on the substrate by wet etching comprises:

patterning the mask material to form an etching mask used for formation of the ink feed hole; and wet etching the rear side of the substrate exposed through the etching mask.

7. The method according to claim 1, wherein the second protective layer is applied to the rear side of the substrate and the mask material such that the second protective layer covers the rear side of the substrate and the mask material, and forming an ink feed hole on the substrate by wet etching comprises:

patterning the mask material and the second protective layer to form an etching mask used for formation of the ink feed hole; and wet etching the rear side of the substrate exposed through the etching mask.

8. The method according to claim 1, wherein forming a nozzle layer comprises:

forming a trench on the front side of the substrate;

forming a sacrificial layer on the substrate, on which the trench and the flow passage formation layer are arranged, such that the sacrificial layer covers the flow passage formation layer;

planarizing the upper surfaces of the sacrificial layer and the flow passage formation layer by chemical mechanical polishing (CMP); and forming a nozzle layer on the sacrificial layer and the flow passage formation layer.

9. The method according to claim 8, further comprising;

removing the sacrificial layer after forming an ink feed hole on the substrate by wet etching.

10. A method of manufacturing an inkjet print head comprising:

forming a flow passage formation layer and a nozzle layer on a front side of a substrate;

forming a first protective layer to cover the flow passage formation layer and the nozzle layer;

applying a mask material used to etch the substrate at a rear side of the substrate;

forming a second protective layer to protect lateral sides of the substrate; and forming an ink feed hole on the substrate by wet etching.

11. The method according to claim 10, wherein the forming an ink feed hold comprises patterning the mask material and the second protective layer before etching.

12. A method of manufacturing an inkjet print head comprising:

forming a flow passage formation layer and a nozzle layer on a surface of a substrate by photolithography;

forming a first protective layer to cover the flow passage formation layer and the nozzle layer;

applying a mask material used to etch the substrate at a rear side of the substrate;

applying a second protective layer to at least one side of the substrate and the mask material such that the second protective layer covers the at least one side of the substrate and the mask material; and wet etching the rear side of the substrate to form an ink feed hole.

* * * * *